(No Model.)
I. G. POLLARD.
FARRIER'S TOOL.
No. 366,605. Patented July 12, 1887.
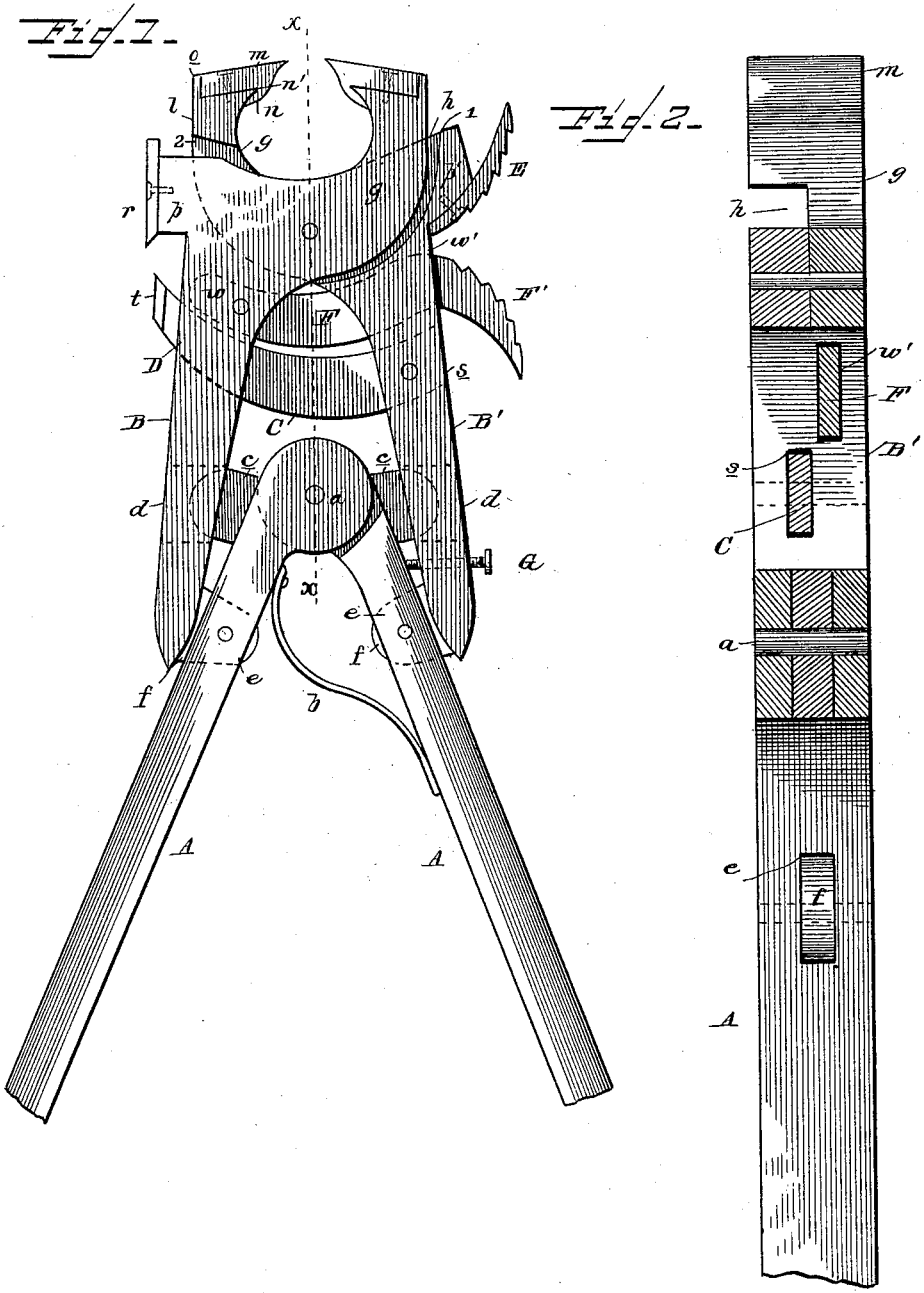
Witnesses
Edwin L. Yewell
Chas. A. Helm
Inventor
I. G. Pollard,
By his Attorney
W. A. Redmond.

UNITED STATES PATENT OFFICE.

ISAAC G. POLLARD, OF EVANSBURG, PENNSYLVANIA.

FARRIER'S TOOL.

SPECIFICATION forming part of Letters Patent No. 366,605, dated July 12, 1887.

Application filed February 25, 1887. Serial No. 228,828. (No model.)

*To all whom it may concern:*

Be it known that I, ISAAC G. POLLARD, a citizen of the United States, residing at Evansburg, in the county of Crawford and State of Pennsylvania, have invented certain new and useful Improvements in Farriers' Tools; and I do hereby declare the following to be a full, clear, and exact description of the invention, such as will enable others skilled in the art to which it appertains to make and use the same.

This invention relates to farriers' tools, and it has for its object to provide a hoof nipper or trimmer, a nail-nipper, and a nail-clincher, all combined in a handy compass in one tool of simple and durable construction; and it consists of the parts and combinations of parts hereinafter described and claimed.

In the accompanying drawings, forming a part of this specification, Figure 1 is a side elevation of the tool complete, the handles being partly broken away; and Fig. 2, an enlarged sectional view on the line $xx$, Fig. 1.

Similar letters refer to similar parts throughout both views.

A represents the grasping handles or levers of the tool, which are pivotally joined together by means of a slot formed in the end of one of the levers, and the end of the other being provided with a tongue to fit in the slot, and secured therein by a pin, $a$, being passed through them both. These handles or levers are kept apart or spread by a curved flat spring, $b$, having one of its ends secured rigidly to the inner portion or side of one of the levers, and its other or free end working or playing against the inner side of the opposite lever.

On the ends of the levers A, at about opposite their pivotal point, tongues $c$, having rounded ends, are formed and project therefrom at right angles and enter slots $d$, formed in the auxiliary levers B B', as indicated by dotted lines in Fig. 1. Immediately below the tongues $c$ slots $e$, (also indicated by dotted lines in Fig. 1 and in full lines in Fig. 2,) are formed in the levers A to receive tongues $f$, formed on the inner sides of the ends of the auxiliary levers B B', where they are pivotally secured by pins or bolts.

As clearly shown in Fig. 1, the auxiliary levers B B' each terminate in a laterally-projecting curved arm, $g$, forming the jaws for the hoof nipper or trimmer. These arms are countersunk or recessed at $h$ from the point 1 to point 2, to receive the opposite arm or jaw, and the two are pivotally joined or connected together at their center by a pin or bolt, so as to work or turn smoothly and easily on and past each other. The heads $l$ of the arms carry the nipping plates or cutters $m$, forming the hoof-trimmers, which are removably secured to said heads by screws, so that they may be removed for sharpening or repair. These plates $m$ are formed with inwardly-projecting flanges $n$, which fit against the points $n'$ of the heads $l$, and their rear portions against the shoulders $o$, projecting upwardly from said heads.

From the above description it will be readily understood that upon pressing the grasping-levers together the auxiliary levers B B' will be moved toward each other and the nipping-plates $m$ brought together preferably in a shear-cut. The tongues $c$, working in the slots $d$, will guide and steady the auxiliary levers B B' in their movements. On each of the levers B B', I form projections $p$ $p'$, on one of which, $p$, a cutting or nipping plate, $r$, is rigidly secured by a screw or bolt, so as to be easily removed when necessary. As shown, it is somewhat longer than the projection $p$, to which it is secured, and it may be slotted, so that it can be moved back and forth on its screw or bolt, after the latter is loosened, to adjust it and compensate for wear. In the lever B' a slot, $s$, is formed, and one end of a curved flat bar, C, secured therein by a pin or bolt. The other end of said bar projects or passes through a correspondingly-curved slot, D, formed in lever B, (both slots being indicated by dotted lines in Fig. 1, and slot $s$ by full lines in Fig. 2,) and carries a cutting-plate, $t$, so that when the auxiliary levers are brought toward each other the plates $r$ and $t$ will meet. These plates are intended to nip off the heads or points of the nails after they have been driven into the hoof. On the curved side of projection $p'$ a curved plate, E, is rigidly but removably secured by screws. The convex face of this plate is roughened or corrugated, the corrugations trending inward.

F represents a flat bar having two opposite or an ogee curve, one end of said bar being secured by a pin in a slot, $w$, formed in lever B, and the other end passing through a curved slot, $w'$, formed in the lever B', both of these slots $w\ w'$ being immediately above the bar C. The free end F' of bar F, which is of a shorter curve, and preferably of greater width, has on its convex face a series of corrugations trending inward.

G is a set-screw passing through one of the levers B B' and resting against one of the levers A, to prevent the nipping-plates from being brought forcibly together and their edges dulled or broken.

To operate the tool, after a shoe has been nailed on the hoof of a horse the hoof is trimmed—that is, that part of the hoof which may project beyond the edge of the shoe is nipped off by the nippers $m$. Then the projecting parts of the nail, either or both heads and points, are nipped off by the cutters $r$ and $t$, and the nails clinched with the curved plates E F', the former being caught on the shoe or bottom part of hoof and levers brought together, which will cause the part F' to be pressed against the nail and the same turned inward and clinched.

Having thus described my invention, what I claim as new, and desire to secure by Letters Patent, is—

1. The combination, in a farrier's tool, of the grasping-levers A, pivotally secured together at one end, and having the slots $e$ and tongues $c$, the auxiliary levers B B', pivoted together and having the tongues $f$ and slots $d$, the plates $m$, removably secured to the heads of said levers, the spring $b$, and set-screw G, substantially as described.

2. The combination, in a farrier's tool, of the grasping-levers A, pivotally secured together and having the tongues $c$ and slots $e$, the auxiliary levers B B', pivoted together and having the tongues $f$, slots D $d$, projections $p$, plate $r$, and nippers $m$, the curved bar C, and plate $t$, substantially as described.

3. The hereinbefore-described farrier's tool, consisting of the levers A, having the tongues $c$ and slots $e$, the auxiliary levers B B', having the tongues $f$, slots D $d$ and $w\ w'$, the projections $p\ p'$, plate $r$, heads $l$, nipping-plates $m$, curved roughened plate E, the curved bar C, plate $t$, the double curved bar F, having the corrugated end F', spring $b$, and set-screw G, as set forth.

4. The combination, in a nail-clincher, of the levers A, pivotally joined together and provided with tongues $c$, the auxiliary levers B B', pivotally secured to said levers A, and provided with slots $d$ and curved slots $w\ w'$, the projection $p'$, the corrugated plate E, and the double curved bar F, having the corrugated part F', secured to lever B, and working in the curved slot $w'$, as set forth.

In testimony whereof I affix my signature in presence of two witnesses.

ISAAC G. POLLARD.

Witnesses:
 JOHN M. CROUCH,
 JOHN O. MCCLINTOCK.